March 16, 1943.  G. P. CURRY  2,313,807

FINGER PRINTING

Filed Feb. 3, 1941

Gladys P. Curry Inventor

Patented Mar. 16, 1943

2,313,807

UNITED STATES PATENT OFFICE 2,313,807

FINGERPRINTING

Gladys P. Curry, Boston, Mass.

Application February 3, 1941, Serial No. 377,171

3 Claims. (Cl. 41—24)

This invention relates to making finger print records for the purpose of identifying persons.

In making finger prints, it is common practice to ink the surface of the markings upon a finger by rolling the finger over an inked surface and then rolling the inked finger upon the surface of a record sheet thereby obtaining an ink print showing the characteristic markings on the finger. It is common knowledge that any person can be identified by finger prints because the finger prints of any person made at different times can be identified by an expert as the prints of that person.

It often is necessary or desirable to make finger prints of a deceased person or a person whose fingers are temporarily crippled due to rheumatism or arthritis. In the case of the latter person, it is obvious that the making of finger prints by the method above described either would be impossible or could not be accomplished without causing that person great pain. Prior to the present invention, it has been very difficult to make finger prints of a deceased person and often the prints obtained have been unsatisfactory, these difficulties and unsatisfactory results being caused by the flabby abnormal condition of the flesh.

The present invention provides a method of finger printing which may be used for making finger prints of normal healthy living persons but is especially suitable for making finger prints of deceased persons or persons whose fingers are crippled. In accordance with the present invention, a hollow body is produced having in the surface of its wall an impression representative of the markings on the finger being printed. This hollow body is shaped to correspond substantially to the surface layer of the finger being printed. One satisfactory method for producing this hollow body comprises coating the end portion of the finger with a solution of a plastic composition capable of drying or solidifying by mere exposure to air. By exposing the coating to the surrounding air for a short period of time, a solid flexible coat is produced having accurately molded in its inner surface an impression representation of the markings upon the finger. The coat then is removed from the finger and turned inside out so that the impression of the markings on the finger now is located in the outer surface of the coat. A finger-like form such as the finger of the finger print expert is inserted in the coat and the impression in the latter is inked and a print produced in accordance with common finger print making practice.

The invention will be more clearly understood from the following description on conjunction with the accompanying drawing; in which.

Figure 1:
Figs. 1, 2 and 3 are perspective views illustrating successive steps in producing a hollow body having an impression of the markings upon a finger to be printed.
Figure 2:
Figure 3:
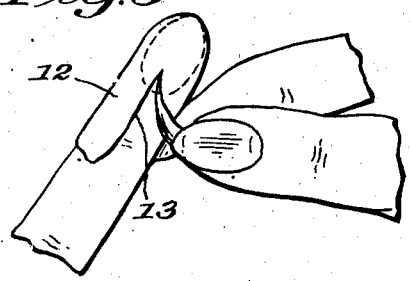
Figure 4:
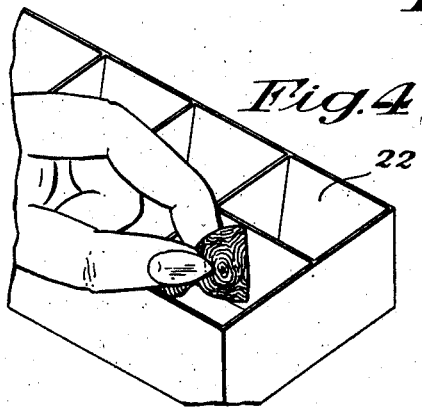
Fig. 4 is a fragmentary perspective view of a partitioned receptacle used in the practice of the invention.
Figure 5:
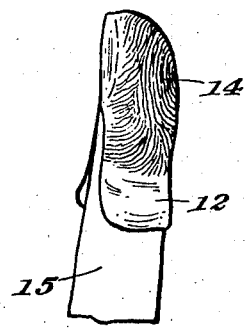
Figs. 5, 6 and 7 are perspective views illustrating additional steps of the method of the invention.

Referring to the accompanying drawing, in accordance with the preferred practice of the invention the end portion of the finger of a deceased person, for example, is immersed in a colloidal solution of latex 10 contained in a receptacle 11 as illustrated in Fig. 1. The finger is withdrawn from the solution and held upright as shown in Fig. 2 until the coating 12 has solidified. The operations are repeated until the coating 12 has been built up to the desired thickness. The back of the coating 12 is slit as indicated at 13 in Fig. 3 to facilitate its removal from the finger. After the coating has been removed from the finger, it is turned inside out so that the impression 14 Fig. 5 formed on its inner surface now is on its outer surface. The coating 12 now is fitted over a finger-like form or the finger 15 of the finger print expert as shown in Fig. 5.

Figure 6:
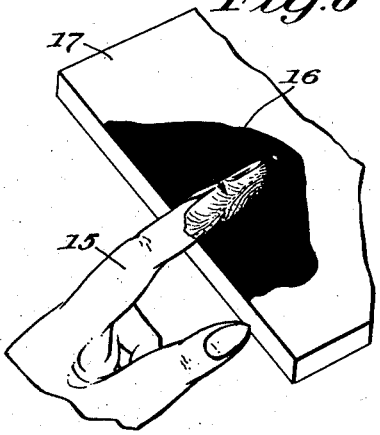
Figure 7:
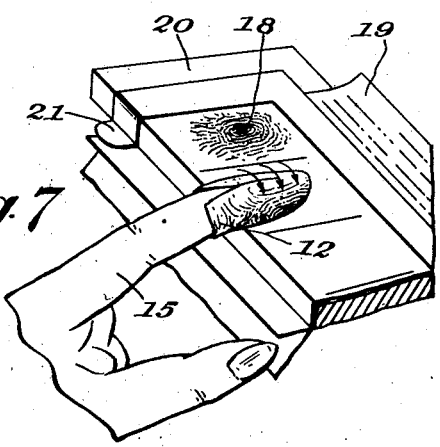

Finger print ink 16 is spread upon the surface of a support 17 and the finger 15 together with the coating 12 is rolled over the ink 16 as indicated by the arrows in Fig. 6 thereby depositing ink upon the projections of the impression 14. A print 18 is formed upon a record sheet 19 Fig. 7 by rolling the finger 15 together with the inked coating 12 over the record sheet 19 as indicated by the arrows in Fig. 7. Preferably, the record sheet 19 is a transparent sheet of cellulose acetate having one surface frosted and is held upon a support 20 by a clamp 21 with the frosted surface exposed. Thus, in accordance with preferred practice of the invention, the print 18 is formed upon the frosted surface of the record sheet.

Figure 8:
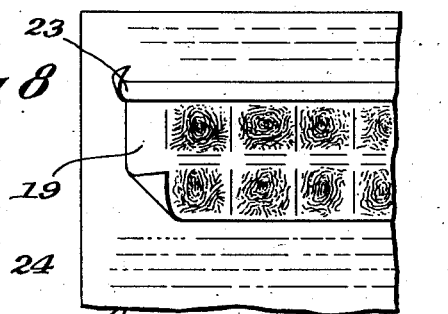
Fig. 8 is a fragmentary plan view of a finger print record card produced by the practice of the invention.

If all the fingers of both hands of a person are to be finger printed, it has been found more convenient to produce a coat 12 on each finger successively and deposit each coat as produced in a predetermined identifying compartment in a receptacle 22. After all the coats have been produced, they are each inked as previously described successively and a print 18 corresponding to each is formed on a predetermined identifying section on the frosted surface of the record sheet 19. When the prints corresponding to all the fingers have been completed, the record sheet 19 is secured by a binding 23 to a record card 24 with the frosted surface of the record sheet adjacent the surface of the record card as indicated in Fig. 8.

The solution of plastic composition used in the preferred practice of the invention is a colloidal solution of rubber or latex in a volatile solvent containing sufficient ammonia to prevent coagulation of the latex when not directly exposed to the air but insufficient to prevent coagulation when a thin film of the solution is exposed to the air. Consequently, a coating on a finger quickly solidifies to form a coat which is sufficiently flexible and resilient so that it may be removed from the finger without becoming permanently distorted. It will be understood that the invention is not limited to this specific solution as various other plastic compositions may be employed.

I claim:

1. The method of making finger print records which comprises forming a flexible coating over the end portion of a finger having an impression in its inner surface representative of the markings on said finger by applying thereto a solution of a plastic composition capable of solidifying merely by exposure to air, removing the coating and turning it inside out so that said impression is on its outer surface, placing the coating inside out over a finger-like form, inking the projections in said impression, and forming in a record sheet a print of said impression.

2. The method of making finger print records which comprises forming a flexible coating over the end portion of a finger having an impression in its inner surface representative of the markings on said finger by applying thereto a solution of a plastic composition capable of solidifying merely by exposure to air, removing the coating and turning it inside out so that said impression is on its outer surface, placing the coating inside out over a finger-like form, inking the projections in said impression, forming on a transparent sheet a print of said impression, and securing said transparent sheet upon a record card with the printed surface adjacent said card.

3. The method of making finger print records which includes the steps comprising forming a coating over the end portion of a finger having an impression in its inner surface representative of the markings on said finger by applying thereto a colloidal solution of latex capable of solidifying merely by exposure to air, and turning said coating inside out.

GLADYS P. CURRY.